United States Patent [19]

Butler

[11] Patent Number: 4,753,054
[45] Date of Patent: Jun. 28, 1988

[54] COVER CONSTRUCTION

[76] Inventor: Robert G. Butler, 20 South St., Westboro, Mass. 01580

[21] Appl. No.: 42,302

[22] Filed: Apr. 24, 1987

Related U.S. Application Data

[63] Continuation-in-part of Ser. No. 669,115, Nov. 7, 1984, abandoned, and Ser. No. 861,458, May 9, 1986, Pat. No. 4,671,025.

[51] Int. Cl.4 .............................................. A01G 9/00
[52] U.S. Cl. ............................................ 52/18; 52/66; 52/71; 52/643; 47/17; D25/27
[58] Field of Search ...................... 47/17; D25/27, 80; 52/18, 64, 66, 71, 639, 643

[56] References Cited

U.S. PATENT DOCUMENTS

| | | | |
|---|---|---|---|
| 756,091 | 3/1904 | Altick | 52/71 |
| 1,070,434 | 8/1913 | Farquar | 52/199 |
| 1,999,219 | 4/1935 | Toney | 189/78 |
| 2,046,600 | 7/1936 | Atkinson | 47/17 |
| 2,384,719 | 9/1945 | Anderson | 108/1 |
| 2,653,553 | 9/1953 | Jacobs | 108/1 |
| 3,018,858 | 1/1962 | Finlayson | 189/2 |
| 3,143,194 | 8/1964 | Hart | 52/561 |
| 3,266,201 | 8/1966 | Christ-Janer | 52/18 |
| 3,323,820 | 6/1967 | Braccini | 287/189 |
| 3,591,991 | 7/1971 | Zetlin | 52/73 |
| 3,751,865 | 8/1973 | Brigham | 52/92 |
| 3,766,693 | 10/1973 | Richards | 52/71 |
| 3,854,266 | 12/1974 | Salas | 52/742 |
| 3,857,150 | 12/1974 | Faucheux | 29/155 |
| 4,014,133 | 3/1977 | Brown | 47/17 |
| 4,146,997 | 4/1979 | Diethorn | 1/32 |
| 4,262,461 | 4/1981 | Johnson | 1/32 |
| 4,381,629 | 5/1983 | Ahn | 1/343 |
| 4,671,025 | 6/1987 | Butler | 52/18 |

FOREIGN PATENT DOCUMENTS

| | | | |
|---|---|---|---|
| 2344322 | 3/1975 | Fed. Rep. of Germany | 52/18 |
| 3403602 | 8/1985 | Fed. Rep. of Germany | 52/64 |
| 1092370 | 4/1955 | France | 52/18 |
| 2414105 | 9/1979 | France | 52/66 |
| 255945 | 8/1926 | United Kingdom | 47/17 |
| 317806 | 8/1929 | United Kingdom | 47/17 |
| 458642 | 3/1975 | U.S.S.R. | 52/71 |
| 916697 | 3/1982 | U.S.S.R. | 52/18 |
| 1183636 | 10/1985 | U.S.S.R. | 52/66 |

Primary Examiner—John E. Murtagh
Assistant Examiner—Andrew Joseph Rudy
Attorney, Agent, or Firm—Blodgett & Blodgett

[57] ABSTRACT

Construction for roof of greenhouse consisting of triangular glazed panels are hinged together and removable to provide a sawtooth construction when assembled and placed over a rectangular base.

12 Claims, 3 Drawing Sheets

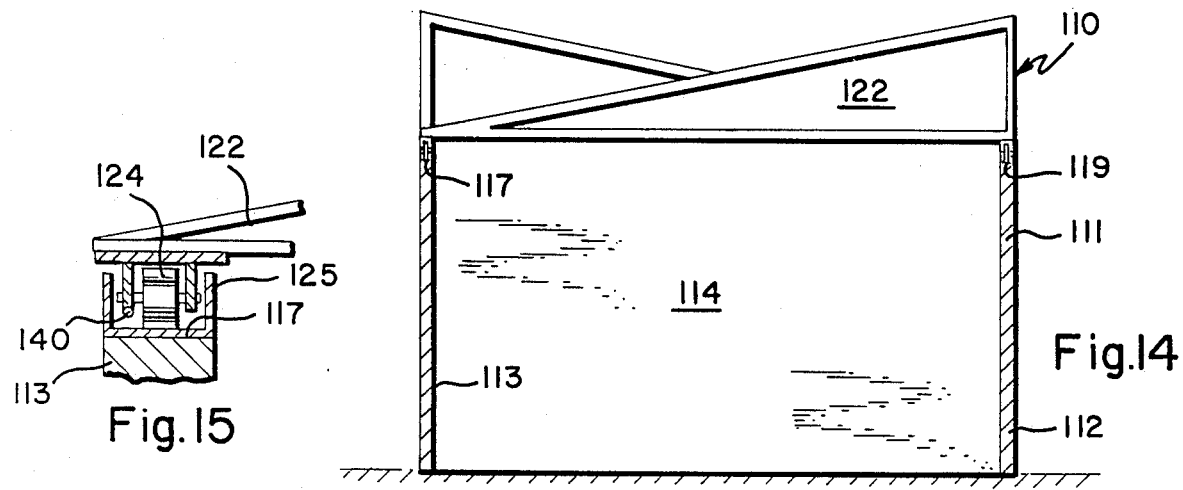
Fig.15
Fig.14
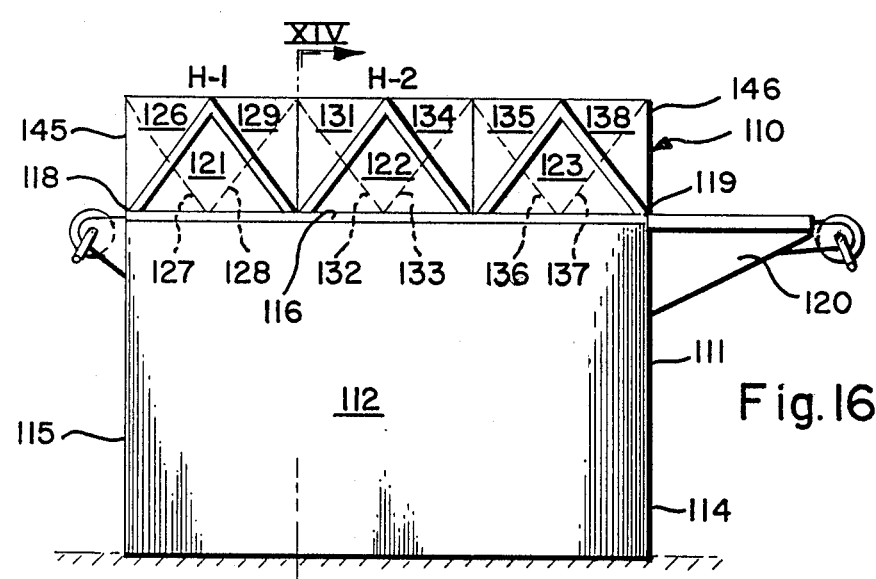
Fig.16
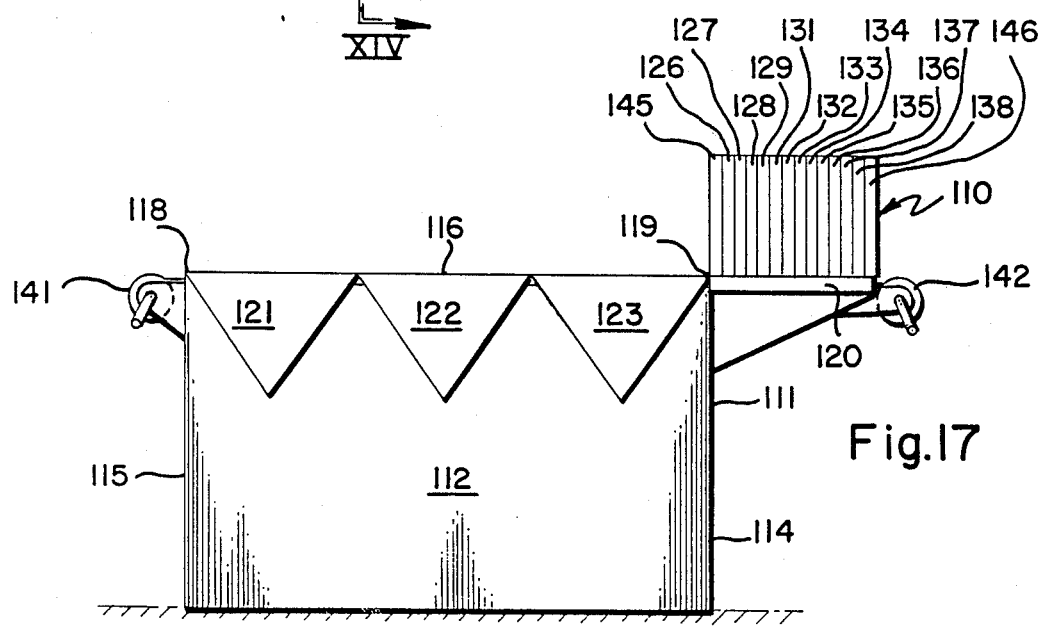
Fig.17

COVER CONSTRUCTION

This is a continuation-in-part of copending application Ser. No. 669,115, (now abandoned), filed on Nov. 7, 1984 and Ser. No. 861,458 filed on May 9, 1986 U.S. Pat. No. 4,671,025.

BACKGROUND OF THE INVENTION

In the construction and operation of greenhouses, swimming pools, and similar structures, it is often necessary at times to provide a completely glazed cover or roof for maximum solar heating and maximum growing conditions (in the case of the greenhouse). At other times, however, it is often desirable to open the interior of the greenhouse to either direct sunlight or natural weather conditions. In the past, roof and cover frames have been provided with glazed vents which move away from the frames to allow the flow of air through the structure when desirable. In other words, the structure has been provided with a rigid, non-removable framework to which the vents were hingedly attached. Although these structures have been provided with sawtooth construction and served their purpose after a fashion, there was a considerable problem in some climates with snow loading. Furthermore, they did not readily drain from the valleys between the peaks. In addition, they were subject to damage, while the replacement of damaged or broken panels was a difficult and expensive matter. Furthermore, the structures have been basically expensive in their initial construction. These and other difficulties experienced with the prior art devices have been obviated in a novel manner by the present invention.

It is, therefore, an outstanding object of the invention to provide a cover construction which permits multifunctional operation.

Another object of this invention is the provision of a construction for a greenhouse roof or the like in which glazed panels can be hinged to open position or can be entirely removed.

A further object of the present invention is the provision of cover or roof construction which is capable of extensive snow loading without damage and which drains very well.

It is another object of the instant invention to provide a roof structure which is simple in construction, which is inexpensive to manufacture, and which is capable of a long life of useful service with a minimum of maintenance.

A still further object of the invention is the provision of a construction for a greenhouse roof and the like, wherein the glazed area is maximized and the benefits of solar heating are obtained in addition to heating by conventional heating sources.

It is a further object of the invention to provide a clear-span cover construction which is light in weight and which provides a maximum length of bridging without the use of intervening permanent beams and supports.

A further object of the invention is the provision of a greenhouse in which, because of the rectangular side wall construction and the rectangular base plan, the side walls can be as high as needed to make the structure accessible to motorized equipment or to adapt it to any intended use.

With these and other objects in view, as will be apparent to those skilled in the art, the invention resides in the combination of parts set forth in the specification and covered by the claims appended hereto.

SUMMARY OF THE INVENTION

In general, the invention consists of a cover construction having a rectangular base consisting of vertical front, rear, right side, and left side walls that are permanently fastened together. The walls have straight top edges lying in a common horizontal plane. End panels of isoceles triangular form are provided which extend upwardly in the plane of the front and rear walls. At least two end panels are associated with the upper edge of the front wall and one end panel is associated with the upper edge of the rear wall. The peak of the end panel on the rear wall lies in a vertical plane parallel to the side walls and is located mid-way between the peaks of the end panels on the front walls. Glazed panels of triangular form are provided extending from the end panels of the front walls to the end panels of the rear wall. The sole support for each glazed panel consists of the end panels and other adjacent glazed panels.

More specifically, each glazed panel consists of a rigid open frame having a sheet of light-transmitting material overlying each side, thus providing spaced parallel sheets for passive solar heating and heating efficiency. The glazed panels are joined to form a self-supporting structure. The end panels are hingedly connected to their base walls and are detachably connected to the adjacent glazed panels, so that the end panels can be moved outwardly to permit venting. Each glazed panel is in the form of a right triangle with a short side, a long side, and a hypotenuse, the short side lying along, joined to, and of the same length as the side of one of the end panels. The hypotenuse of each glazed panel is removably fastened to the hypotenuse of an immediately adjacent glazed panel to form a ridge line. The long side of each glazed panel is hingedly attached to the long side of an immediately adjacent glazed panel to form a valley line.

BRIEF DESCRIPTION OF THE DRAWINGS

The character of the invention, however, may be best understood by reference to one of its structural forms, as illustrated b accompanying drawings, in which:

FIG. 14 is a vertical sectional view of a modification of the invention taken on the line XIV—XIV of FIG. 16, FIG. 15 is an enlarged view of a portion of the invention shown in FIG. 14, FIG. 16 is an elevational view of the modification of the invention showing the roof structure in operative mode, and FIG. 17 is a front elevational view of the modification of the invention, showing the roof structure in stored mode.

DESCRIPTION OF THE PREFERRED EMBODIMENT

Figure 1:
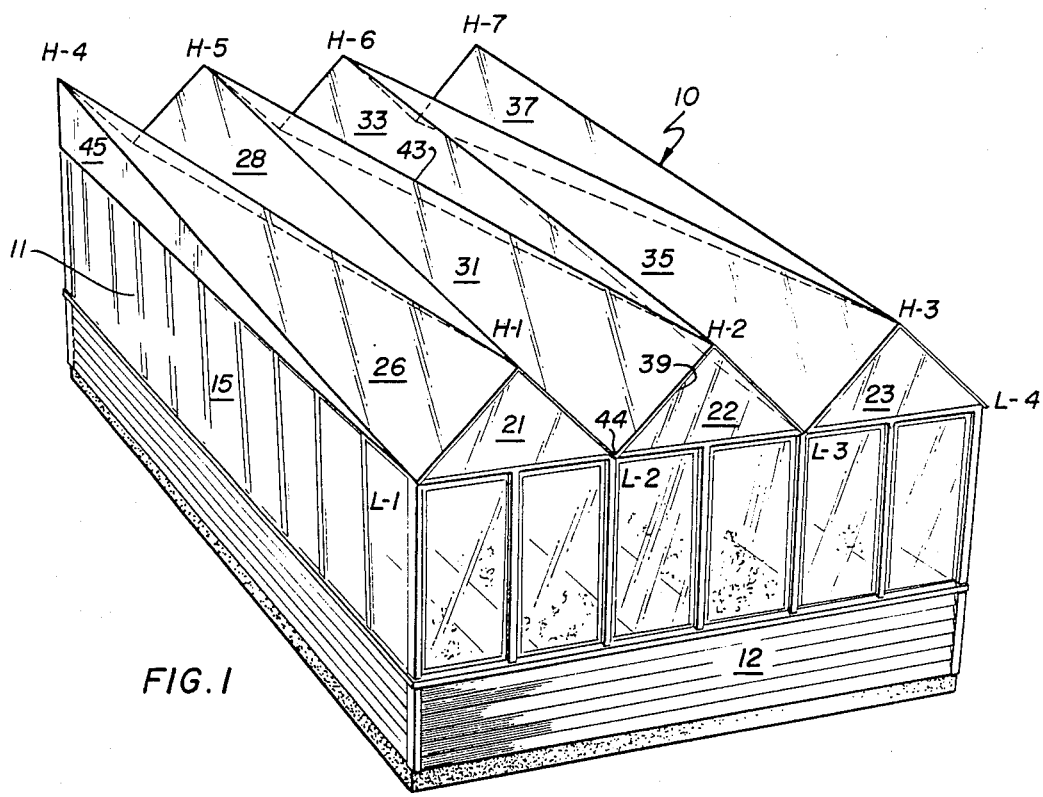
FIG. 1 is a perspective view of a cover construction incorporating the principles of the present invention.
Figure 2:
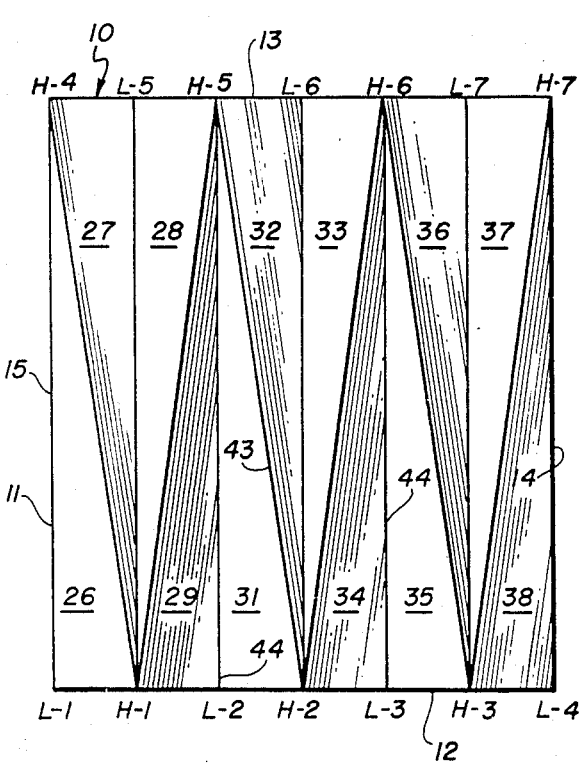
FIG. 2 is a top plan view of the cover construction.
Figure 3:
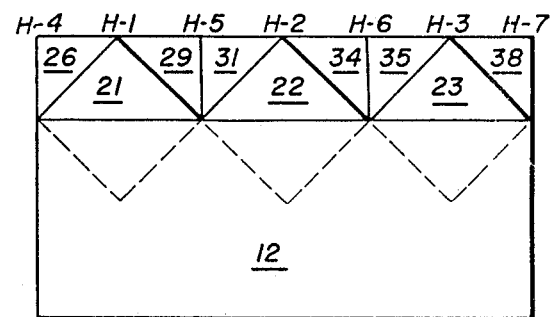
FIG. 3 is a front elevational view of the construction.
Figure 4:
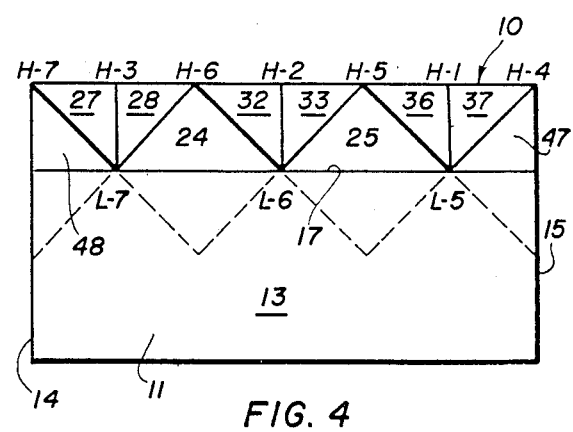
FIG. 4 is a rear elevational view of the construction.

Referring first to FIGS. 1 thru 6, which show the general features of the invention, the cover construction, indicated generally by the reference numeral 10, is shown as having a rectangular base 11 that consists of a vertical front wall 12, a rear wall 13, a right side wall 14, and a left side wall 15. These walls are permanently fastened together and to a foundation in the usual way and have straight top edges lying in a common horizontal plane. These top edges are top edge 16 in the case of the front wall 12, a top edge 17 on the rear wall 13, a top edge 18 on the right side wall 15, and a top edge 19 on the left side wall 14. End panels 21, 22, and 23 extend upwardly from the upper edge 16 of the front wall 12, these panels being of isoceles triangular form. As is most evident in FIG. 4, the upper edge 17 of the rear wall 13 is provided with similar isoceles triangular panels 24 and 25 which are centrally located and with spaced half panels 47 and 48 at the ends. There is at the upper edge 17 of the rear wall 13, an end panel 25 associated with the two end panels 21 and 22 on the upper edge 16 of the front wall 12. A peak H-5 of the end panel 25 at the rear wall lies in a vertical plane which is parallel to the side walls 15 and 14 and lies midway between the peaks H-1 and H-2 of the end panels 21 and 22, respectively. Glazed panels 26 through 38 join the end panels 21, 22, and 23 of the front wall to the end panels 24, 25, 47 and 48 of the rear wall. The sole support for each glazed panel consists of the end panels with which it is associated and the other immediately adjacent glazed panels.

Figure 7:
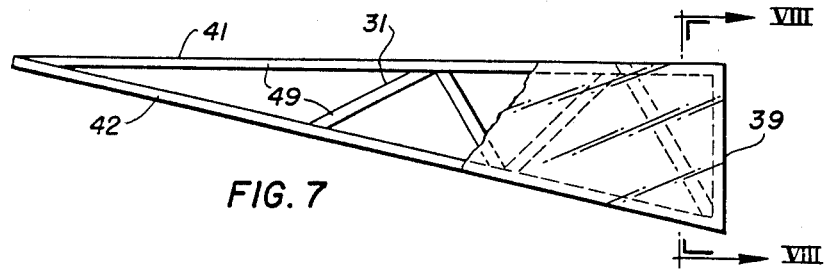
FIG. 7 is a front elevational view of a glazed panel forming part of the construction.
Figure 8:
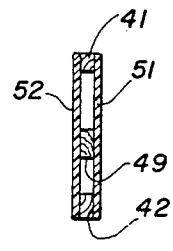
FIG. 8 is a sectional view of the panel taken on the line VIII—VIII of FIG. 7.
Figure 9:
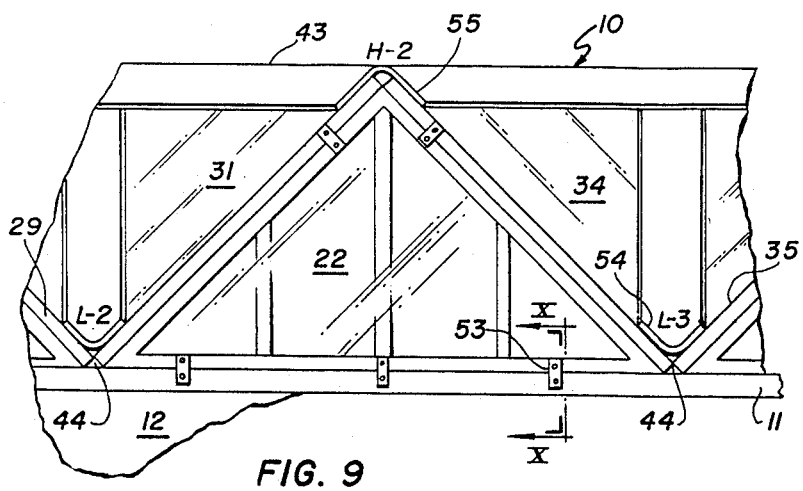
FIG. 9 is an enlarged front elevational view of a portion of the construction.

Referring to FIGS. 7 and 8, each glazed panel is similar to the panel 31 shown in the drawing and is in the form of a right triangle with a short side 39, a long side 41, and a hypotenuse 42. Each panel has the short side 39 lying along, joined to, and of the same length as the side of one of the end panels with which is associated. For instance, in the case of the glazed panel 31, it can be seen that its short side 39 rests on the inclined edge of the end panel 22, as is evident in FIG. 1. The hypotenuse 42 of the glazed panel 31 is removably fastened to the hypotenuse of the immediately adjacent glazed panel 32, as is evident in FIG. 1, along a ridge line extending from peak H-2 to H-5. This ridge line is indicated by the reference numeral 43 in FIG. 9. The long side 41 of the glazed panel 31 is hingedly attached to the corresponding long side of the immediately adjacent glazed panel 29 to form the valley line 44. Each of the glazed panels is similarly joined along its long side to another panel to form a valley line.

Figures 5, 6:
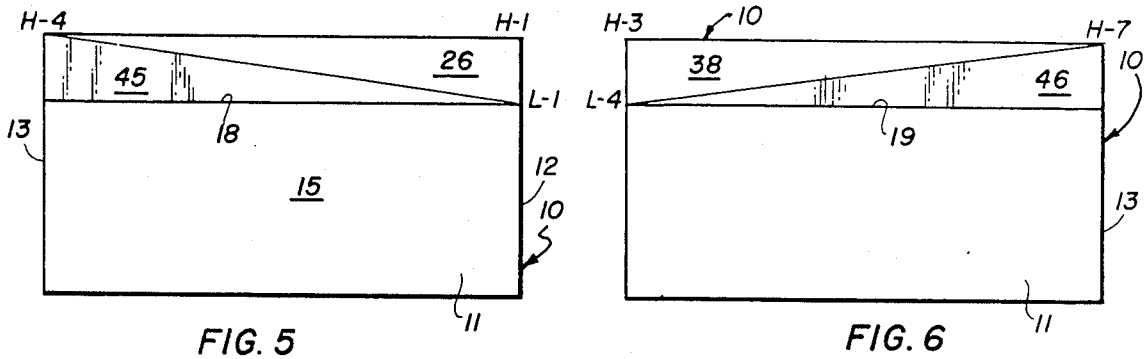
FIG. 5 is a left side elevational view of the construction.
FIG. 6 is a right side elevational view of the construction.

As is evident in FIG. 5, a triangular side panel 45 is mounted at the upper edge 18 of the right side wall 15 of the base, while in FIG. 6, it can be seen that a similar triangular side panel 46 is mounted at the upper edge 19 of the right side panel 14. Each of these side panels 45 and 46 are a right triangle having a long side joined to and coextensive with the upper edge 18 and 19, respectively, of the side wall on which it is mounted, while its hypotenuse is hingedly attached to an intermediate adjacent glazed panel. In the case of the side panel 45, it is hingedly attached to the hypotenuse of the glazed panel 26, while in the case of the side panel 46 its hypotenuse is attached hingedly to the glazed panel 38.

As is evident in FIGS. 5 and 6, each triangular side panel 45 and 46 has a short side that extends upwardly from the junction of the side wall of the base with the rear wall. The short side of the side panel 45, for instance, is attached to the special half panel 47 (see FIG. 4), while the side panel 46 is attached to the special half panel 48. Each of the half panels 47 and 48 are a special end panel which consists of half of the regular isoceles triangular form.

It should be noted also that each of the special end panels 47 and 48 are in the form of one-half of the above-described isoceles triangular end panels and has a hypotenuse which lies along and is attached to the short side of a glazed panel. In the case of the end panel 47, this is the glazed panel 37, while in the case of the end panel 48, it is the glazed panel 27.

Referring again to FIGS. 7 and 8, it can be seen that the glazed panel 31 (which is exactly similar to the other glaze panels) consists of a rigid open frame 49, having a sheet 51 and 52 of clear plastic lying each side, thus providing spaced, parallel sheets for passive solar heating. In the preferred embodiment, the sheet is formed of a polymer plastic, such as polyethylene.

Referring to FIGS. 10, 11, 12, and 13, it can be seen that the glazed panels are joined to form a self-supporting structure. The end panels are hingedly-connected to their base walls and detachably connected to the adjacent glazed panels, so that the end panels can be moved outwardly to provide venting. The glazed panels are joined to each other and to the end panels by use of flexible weather-resistant straps.

For the purpose of description, the upper apices of the end panels are indicated on the drawings by reference numerals H-1, H-2, H-3, H-4, H-5, H-6, and H-7. Similarly, the low points between the end panels are indicated on the drawings by reference numerals L-1, L-2, L-3, L-3, L-4, L-5, L-6, and L-7. Each peak is joined by a ridge line to two other peaks; for instance, peak H-2 is joined by a ridge line 43 to the rear wall peaks H-5 and H-6. Each high point is also joined by a valley line 44 to a low point or junction between the end walls at the opposite wall. For instance, the high point H-1 of the end panel 21 is joined by a valley line to L-5. A ridge line 44 is the one which joins the peak H-5 to the junction L-2. The ridge line 43 is the ridge line which joins the peak H-2 of the end panel 22 to the high point H-5 of the rear panel 25.

Figure 10:
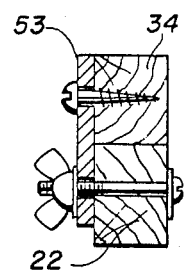
FIG. 10 is a sectional view of the construction taken on the line X—X of FIG. 9.
Figures 11, 12:
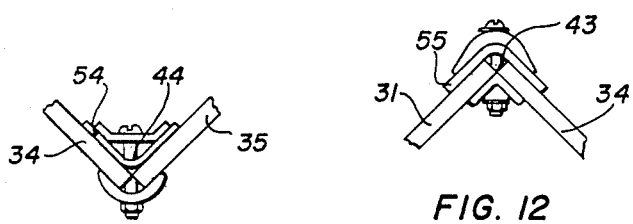
FIG. 11 is an enlarged view of a portion of the construction shown in FIG. 9.
FIG. 12 is an additional enlarged portion of the construction shown in FIG. 9.
Figure 13:
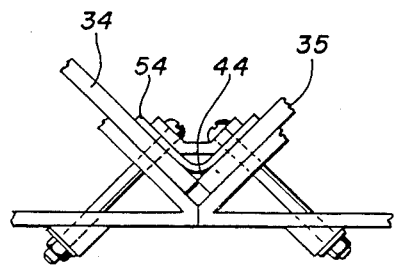
FIG. 13 is an enlarged view of another portion of the construction shown in FIG. 9.

FIG. 10 shows the manner in which the glazed panel 34 is attached to a beam of the end panel 22 by a flexible strap 53 which can be disconnected by a bolt and wing nut. Similarly, FIGS. 11 and 13 show the use of a polytetraethylene strap 54 joining the glazed panels 34 and 35, while allowing hinging between them. FIG. 12 shows the manner in which the ridge lines are constructed with a protective polytetraethylene element 55.

Generally speaking, the glazed panels are intended to be hinged about the valley lines, (similar to the valley line 44) to lie against the adjacent glazed panel with which it shares a common valley line. For instance, the glazed panels 34 and 35 (see FIG. 2) are hinged together in the manner shown in FIGS. 11 and 13, so that the panel 34 may be rotated or folded over to lie against the panel 35. This means that the ridge line connections are such that they are easily disconnected (as indicated in FIG. 12), so that the folding is possible. At the same time, in order to remove all of the glazed panels, it is only necessary to disconnect them along the ridge lines to allow the entire removal of the glazed panel in pairs. Of course, it is also necessary to disconnect the panels where they are attached to the end panels, the nature of the connection being shown in FIG. 10. The use of the Teflon strips 54 and 55 serves to seal the joint between the glazed panels.

The operation and advantages of the present invention will now be readily understood in view of the above description. In the condition of the greenhouse construction shown in FIG. 1, the glazed panels are all in place and the construction operates as a conventional greenhouse. The plants growing on the inside are subjected to that degree of heat and light which is necessary for their growth. In the case of rain, the drainage takes place down the valley lines 44 to both ends of the building, so that neither end carries an extraordinary amount of fluid. The fact that each valley line 44 slopes from a high point to a valley (from a point H-6 which is high to L-3 which is low) means that the flow of fluid takes place adequately. At the same time, the matching of the glazed panels means that all panels are in a slope leading downwardly into a valley line. When snow-loading takes place, the panels are inclined equally between the front wall 12 and the rear wall 13, so that the loading is evenly distributed. Because of the fact that the panels are made of a smooth sheet material, there is a tendency in any case for any snow or ice to slide downwardly into a valley. The reflection of sunlight from the inclined surfaces surrounding each valley line will encourage the melting of the snow as rapidly as possible. Furthermore, heat contained within the greenhouse during winter periods (due to the solar heating or other heating sources) will also encourage the melting of snow.

At certain times of the year it is desirable to reduce the heating to a certain extent and to allow air to flow freely. There are various ways in which this can be done. As pointed out above, the end panels 21, 22, 23, 24, 25, 47, and 48 can be moved outwardly by hinging action about the upper edges of the front and rear walls, thus opening the ends of the roof to allow free flow of air. At that time, the heating action of the glazed panels still take place. At other times, it is even desirable to allow rain as well as sunlight and air to enter directly through the top of the roof of the greenhouse. In that case, the glazed panels can be swung outwardly about their valley lines. In every case, is the so-called "long side" similar to the long side 41 of the panel 31, shown in FIG. 7, that is disconnected. In the event that the entire opening is desired, pairs of panels joined by their valley line hinge can be removed from the building to open the entire upper end through to the sky.

It can be seen, then, that the present invention involves a relatively inexpensive construction, because there are no cross beams or supporting roof structures to be supplied. The lower base portion is relatively inexpensive to begin with and all of the roof elements consist of light-weight, easily-installed panels which are of substantially the same construction. In other words, aside from the end panels and some of the special panels, most of the roof is made up of exactly similar triangular glazed panels similar to the panel 31 of FIG. 7. Since double glazing is provided, the use of the greenhouse for passive solar heating is readily accomplished. The use of Teflon tape along the valley lines and the ridge lines promotes a minimum of leakage of water into the building. The hinging and fastening construction shown in the drawings, particularly in FIGS. 10 thru 13, is relatively simple and inexpensive and not easily damaged. Furthermore, if one of the panels develops a tear or a breakage, it is a simple matter to remove it without disturbing the rest of the roof and to carry it down to the ground for repair. The roof structure is mounted on a simple rectangular base building which not only makes it cheaper, but also assures that it have a better appearance. The construction provides a clear span across the roof, so that there are no problems of shadow from cross beams at any time during the operation of the roof. In other words, a maximum area is available for light and heat transmission. Furthermore, the construction gives a maximum light transmission with a maximum of strength, particularly under snow loading. For comparison, it is common to provide greenhouse roofs which permit 25 lbs. of snow load per square foot, but the present construction has been tested to receive 55 lbs. per square foot safely. The desirable appearance is evident, of course, in FIGS. 1 and 2.

Referring next to FIGS. 14 thru 17, which show the general features of a modified form of the invention, the roof construction, indicated generally by the reference numeral 110, is shown as having a rectangular base 111 that consists of a vertical front wall 112, a rear wall 113, a right side wall 114, and a left side wall 115. These walls are permanently fastened together and to a foundation in the usual way and have straight top edges lying in a common horizontal plane. They may form a building, such as a greenhouse, or recreational structure, such as swimming pool. The top edges are top edge 116 in the case of the front wall 112, a top edge 117 on the rear wall 113, a top edge 118 on the right side wall 115, and a top edge 119 on the left side wall 114. End panels 121, 122, and 123 extend upwardly from the upper edge 116 of the front wall 112, these panels being of isoceles triangular form. In the same manner as shown and described in the previously described version of the invention, the upper edge 117 of the rear wall 113 is provided with similar isoceles triangular panels which are centrally located and with spaced half panels at the ends. There is at the upper edge 117 of the rear wall 113, an end panel associated with the two end panels 121 and 122 on the upper edge 16 of the front wall 12. A peak of this end panel at the rear wall lies in a vertical plane which is parallel to the side walls 115 and 114 and lies midway between the peaks H-1 and H-2 of the end panels 121 and 122, respectively. Glazed panels 126 through 138 join the end panels 121, 122, and 123 of the front wall to the end panels of the rear wall. The sole support for each glazed panel consists of the end panel with which it is associated and the other immediately-adjacent glazed panels.

Each glazed panel is similar to the panel 31 shown in the drawing in FIGS. 7 and 8 and is in the form of a right triangle with a short side, a long side, and a hypotenuse. Each panel has the short side lying along, joined to, and of the same length as the side of one of the end panels with which is associated.

A triangular side panel 145 is mounted at the upper edge 118 of the right side wall 115 of the base, a similar triangular side panel 146 is mounted at the upper edge 119 of the right side panel 114. Each of these side panels are a right triangle having a long side joined to and coextensive with the upper edge 118 and 119, respectively, of the side wall on which it is mounted, while its hypotenuse is hingedly attached to an intermediate adjacent glazed panel.

Each triangular side panel 145 and 146 has a short side that extends upwardly from the junction of the side wall of the base with the rear wall. The short side is attached to the special half panel. Each of the half panels are a special end panel which consists of half of the regular isoceles triangular form.

It should be noted also that each of the special end panels are in the form of one-half of the above described isoceles triangular end panels and has a hypotenuse which lies along and is attached to the short side of a glazed panel.

Each of the glazed panels consists of a rigid open frame, having a sheet of clear plastic lying each side, thus providing spaced, parallel sheets for passive solar heating. In the preferred embodiment, the sheet is formed of a polymer plastic, such as polyethylene.

The glazed panels are joined to form a self-supporting structure. The end panels are hingedly-connected to their base walls and detachably connected to the adjacent glazed panels, so that the end panels can be moved outwardly to provide venting. The glazed panels are joined to each other and to the end panels by use of flexible weather-resistant straps.

Generally speaking, the glazed panels are intended to be hinged about the valley lines, to lie against the adjacent glazed panel with which it shares a common valley line. This means that the ridge line connections are such that they are easily disconnected, so that the folding is possible. At the same time, in order to remove all of the glazed panels, it is only necessary to disconnect them along the ridge lines to allow the entire removal of the glazed panel in pairs. Of course, it is also necessary to disconnect the panels where they are attached to the end panels.

Referring to FIG. 15, each end of each panel, such as panel 122, is provided with a wheel 124 which rides in a channel construction is provided at the upper edge 117 of the rear wall 113. A similar wheel and channel construction is provided at the upper edge 119 of the front wall 112. This allows the panels to be moved to expose portions of the greenhouse, swimming pool, etc. For instance, the panels can be moved to an extension 120 projecting from the upper edge 119 of the right side wall 114, as shown in FIGS. 16 and 17. To facilitate the movement of the panels, a cable 140 extends from a winch 141 at the upper edge 118 of the left side wall 115 to a winch 142 of the outer end of the extension 120.

As is evident in FIG. 17, the entire group of panels can be moved to and stored on the extension 120, thus opening the greenhouse or swimming pool to the sky.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Cover construction, for use on a rectangular base consisting of vertical front rear, right side, and left side walls permanently fastened together, the walls having straight top edges lying in a common horizonital plane, comprising:

(a) end panels of isosceles triangular form extending upwardly and in the plane of the front and rear walls, there being two end panels associated with the upper edge of the front wall and one end panel associated with the upper edge of the rear wall, the peak of the end panel on the rear wall lying in a vertical plane parallel to the side walls and lying midway between the peaks of the end panels on the front walls, and (b) glazed panels of triangular form extending from the end panels of the front wall to the end panel of the rear wall, the sole support for each glazed panel being end panels and other adjacent glazed panels, each panel spanning the top edges of opposite parallel walls and having a wheel at each end riding in guide channels fastened on the said top edge.

2. Cover construction as recited in claim 1, wherein a cable is carried in each guide channel and is fastened to the panels for movement thereof, and wherein winches are provided to activate the cables.

3. Greenhouse construction as recited in claim 2, wherein each glazed panel is in the form of a right triangle with a short side, a long side, and a hypotenuse, the short side lying along, joined to, and of the same length as the side of one of the end panels.

4. Greenhouse construction as recited in claim 3, wherein the hypotenuse of each glazed panel is removably fastened to the hypotenuse of an immediately adjacent glazed panel to form a ridge line.

5. Greenhouse construction as recited in claim 3, wherein the long side of each glazed panel is hingedly attached to the long side of an immediately adjacent glazed panel to form a valley line.

6. Greenhouse construction as recited in claim 3, wherein a a triangular side panel is mounted at the upper edge of both side walls of the base, each such side panel being a right triangle having a long side joined to and coextensive with the upper edge of the side wall on which it is mounted and a hypotenuse that is hingedly attached to an immediately adjacent glazed panel.

7. Greenhouse construction as recited in claim 6, wherein each triangular side panel has a short side that extends upwardly from the junction of the side wall of the base with the rear wall, the short side being joined to a special end panel extending upwardly from the rear wall, which end panel is in the form of one-half of the above-described isosceles triangular end panels, the special end panel having a hypotenuse which lies along and is attached to the short side of the glazed panel to which the side panel is attached.

8. Greenhouse construction as recited in claim 1, wherein each glazed panel consists of a rigid open frame having a sheet of light transmitting material overlying each side, thus providing spaced parallel sheets for passive solar heating.

9. Greenhouse construction as recited in claim 8, wherein the sheet is formed of a polymer plastic.

10. Greenhouse construction as recited in claim 9, wherein the plastic is polytetraethylene.

11. Greenhouse construction as recited in claim 1, wherein the glazed panels are joined to form a self-supporting structure, and wherein the end panels are hingedly connected to their base walls and detachably connected to the adjacent glazed panels, so that the end panels can be moved outwardly to permit venting.

12. Greenhouse construction as recited in claim 4, wherein the glazed panels are joined to each other and to the end panels by use of a flexible weather-resistant strap.

* * * * *